United States Patent Office 3,427,862
Patented Feb. 18, 1969

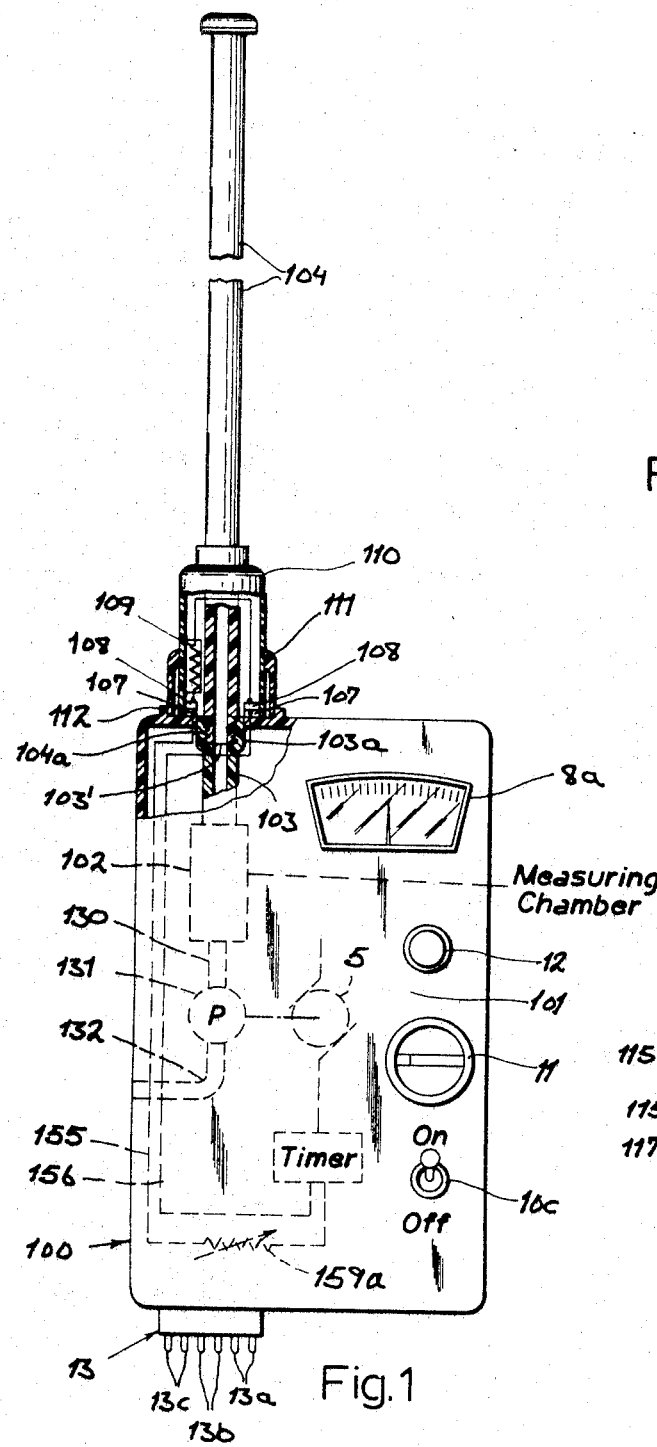

1

3,427,862
GAS ANALYZER WITH GAS-SAMPLE
ASPIRATION
Rolf Hübner, Westfalendamm 267,
Dortmund, Germany
Filed Feb. 23, 1966, Ser. No. 529,463
Claims priority, application Germany, Feb. 24, 1965,
H 55,281
U.S. Cl. 73—23                                                           11 Claims
Int. Cl. G01n 1/22, 31/00

ABSTRACT OF THE DISCLOSURE

Gas analyzer wherein a time-constant network measures an interval during which aspirated ambient gas is analyzed in a measuring chamber, a demountable and/or extensible sampling tube being attached to the housing inlet to enable samples to be taken at different levels; the tube is provided with a compensating impedance, such as a resistance or a capacitance, which modifies the operating interval of the time-constant network in accordance with the variation in the effective volume of the intake duct of the chamber caused by the attachment of the tube or by the change of its length.

My present invention relates to gas analyzers and, more particularly, to portable gas-analyzing devices of the type employed in subterranean locations for the detection of toxic, suffocating or explosive gases and, in general, to gas-analyzing devices of the type described in my copending applications Ser. No. 427,047, filed Jan. 21, 1964, now Patent No. 3,375,700; Ser. No. 440,223 of Mar. 16, 1965, now Patent No. 3,343,402; and Ser. Nos. 521,104 and 521,395 of Jan. 17 and 18, 1966.

Portable gas analyzers for use in mines or the like have been provided heretofore for the detection of "miner's damp" and other gases dangerous to both health and safety of the miner and have included a gas-analyzing chamber into which the ambient gas is drawn by a pump-type aspirator, a measuring circuit responsive to the concentration of carbon dioxide, methane, carbon monoxide or other specific gas in the mixture, and indicating means for providing a visual or audible remote or local indication of the gas concentration as thus measured. Portable devices of this type are generally compact and are carried by the mine worker for the purpose of analyzing the gas concentrations in various locations along the subterranean cavern or are taken along while the miner or other worker is engaged in his normal activity to warn of the development of a dangerous condition. It will be understood that, while devices of this type are valuable for use in mines or the like as indicated, many other uses of the system are also possible and that the references made above and below to mines and miners are merely as examples of the utility of the device.

As has been pointed out in my copending applications mentioned above, the device preferably includes not only the basic systems described but also timing circuits energizable to establish the operating interval of a pump means which induces the flow of ambient gases into the measuring chamber or cylinder and, advantageously, further timer means for establishing an interval between cut-off of the pump means and operation of the measuring circuit, in addition to a timer stage establishing the interval of effectiveness of the measuring circuit. As pointed out

2 in the previously mentioned copending applications, the timer means in each case can be a transistorized flip-flop circuit or some other electronic transistor switch having an R-C network for controlling the switching interval. Time-constant networks of this type have hitherto been employed in such devices, especially as set forth in the aforementioned apparatus, and are adjustable (e.g. by making one or both of the impedances of the time-constant network variable) to permit adjustment of the aspiration period by an operator. It will be understood that this aspiration period is, in turn, a measure of the volume of the gas induced into and/or through the gas-measuring chamber by the pump means. It has been proposed heretofore to provide sampling tubes or the like at the inlet side of the gas passages communicating with the testing chamber and to make these tubes of adjustable length or interchangeable so that sampling of the gases can be effected at any desired height. This is of special significance in subterranean caverns and mines inasmuch as the gas therein tends to stratify and a determination of gas concentration made at a lower level does not always provide a true indication of the gas concentration at a different level. Thus the tube can be telescopic to permit its extension and contraction and allow sampling at different heights. Since the use of such interchangeable or telescopic tubes modifies the volume of the fluid passageways and dead space communicating with the sampling chamber, it has been necessary manually to adjust the timing of the time-constant network to increase the duration of the air aspiration when a telescoping sampling tube is extended or a longer tube is affixed and to decrease this duration when the telescoping tube is shortened or a shorter sampling tube is attached. In practice, it has been found that ordinary personnel using the device are incapable of accurate adjustment of the time interval to compensate for changes in the volume of the fluid passageways leading to the measuring chamber and it has been necessary either to use personnel of greater skill or to accept the inaccuracies and dangers incumbent in the adjustment of the timer by less skilled individuals.

It is, therefore, the principal object of the present invention to provide a gas analyzer, preferably of the portable type, in which the aforedescribed disadvantages are obviated and measurements of greater accuracy can be obtained at various sampling heights.

A further object of this invention is to provide a portable gas analyzer having electronic timing of the gas-aspiration stage which will admit of automatic compensation of the timing in accordance with modification of the volume of the fluid passageways leading to the sampling chambers.

Yet another object of my present invention is to provide an improved gas analyzer which extends the principles originally set forth in my copending applications mentioned above.

These objects and others which will become apparent hereinafter are attained, in accordance with my present invention, by the provision of a gas-measuring or gas-analyzing apparatus which comprises, in a common housing, a measuring chamber for receiving gas samples, pump means connected with the measuring chamber for inducing a flow of ambient gas into the latter, duct means connecting the measuring chamber with the ambient atmosphere, a measuring circuit including concentration-sensitive means responsive to the proportion of a particular component of the gas mixture therein and indicating the concentration of this component, electric timer means connected with the pump means for establishing a gas-aspiration interval of operation of the pump means and provided with at least one electric impedance element controlling the time interval of the last-mentioned means, and means at the aforementioned duct means for varying the volume thereof and including a corresponding impedance element connectable in circuit with the first impedance element for varying the time interval proportionately to the variation in the volume of the duct means.

Thus the system of the present invention provides a resistance or capacitance in addition to the resistance and capacitance controlling the characteristic time interval of the time-constant network and connectable in circuit with the latter upon modification of the volume or dead space of the duct means by extending or contracting a telescope sampling tube or by adding or removing such a tube.

When the sampling tube is removably mounted upon the housing I provide, according to a more specific feature of this invention, co-operating contact means on the sampling tube and the housing for connecting the compensating impedance element in the time-constant network, this impedance element being mounted on or in the sampling tube. When the compensating impedance and the controlling impedance element of the time-constant network are resistive or ohmic impedances, they are connected in series by the contact means, whereas when they are capacitive, they are connected in parallel. When the sampling tube is designed to be of a constant length or to be extended to a predetermined length, the compensating impedance may have a constant impedance value; however, when the length of the tube is adjustable, I prefer to provide a variable impedance element associated with the movable parts of the tube so as to vary the impedance value accordingly. Advantageously, the sampling tube and the housing may be provided with mating coupling means of the bayonet, plug or screw type and the compensating impedance is then mounted in the enlarged plug portion of the sampling tube.

The contact members of the housing are provided in the region of the inlet opening thereof at which the duct means communicating with pump and sampling chamber is open to the atmosphere. Correspondingly, the sampling tube, which is attachable to the housing in registry with this opening, is provided with its contact members in the region of the base of the sampling tube for co-operation with the contact members of the housing. The contacts of the housing portion may, moreover, lie above the housing structure and I have found it highly desirable to form the base of the sampling tube with a cap adapted to enclose the contacts lying outwardly of the housing. The cap itself may have a resilient extremity or may co-operate with a resilient sleeve to sealingly engage the housing or a formation thereof so that gas induction is not permitted except via the inlet opening at the end of the sampling tube. Moreover, the contacts are preferably disposed in an annular sealed compartment surrounding the sampling tube so that the gases cannot enter the compartment or surround the contacts. This arrangement prevents the ignition of the ambient gases by any sparks which may be generated between the mating contact surfaces of the housing and sampling tube; explosions are thus avoided. A further advantage of the sealing cap is the fact that the compensating impedance (i.e. the additional resistor or capacitor) can be disposed in the annular gap between the cap and the sampling tube.

As has been described earlier, the present invention also provides for automatic compensation of the timing of the aspiration period with respect to tubes of variable length, namely, telescoping sampling tubes which can be extended or contracted to raise or lower the mouth of the duct means within the mine tunnel or shaft. According to a feature of this aspect of the invention, two telescopic portions of this sampling tube are designed as a sliding potentiometer with one of these portions carrying an electrical wiper and the other portion forming an elongated resistance body slidingly engaged by the wiper. Thus, one of the telescopingly interfitted tubes can be provided upon a surface confronting the other tube with a strip or layer of a resistive material (e.g. vapor-deposited carbon) while the other tube member is formed with a slide contact running along the strip and, in the manner of a slide-wire potentiometer, increasing the effective resistance of the impedance element as the tube is extended.

It will be apparent that this arrangement permits the automatic compensation of the timer means controlling the duration of operation of the pump and thus permits an accurate adjustment of the aspirated volume of gas in dependence upon the volume of the duct means between the inlet and the sampling chamber. The gas samples supplied to the measuring chamber thus always have the same volume regardless of extension or contraction of the sampling tubes and regardless of the height at which the sample is taken. The accuracy of the gas analysis is consequently markedly improved over prior gas-analyzing systems and the danger of undetected fire damp is considerably reduced.

The above and other objects, features and advantages of the present invention will become more readily apparent from the following description, reference being made to the accompanying drawing in which:

FIG. 1 is an elevational view, partly broken away, of a portable gas analyzer of the type described, for example, in my copending applications described above but provided with a sampling tube in accordance with this invention;

FIG. 2 is an axial cross-sectional view through a telescopable sampling tube in accordance with this invention;

FIG. 3 is a cross-sectional view taken along the line III—III in FIG. 2; and

Figure 4:
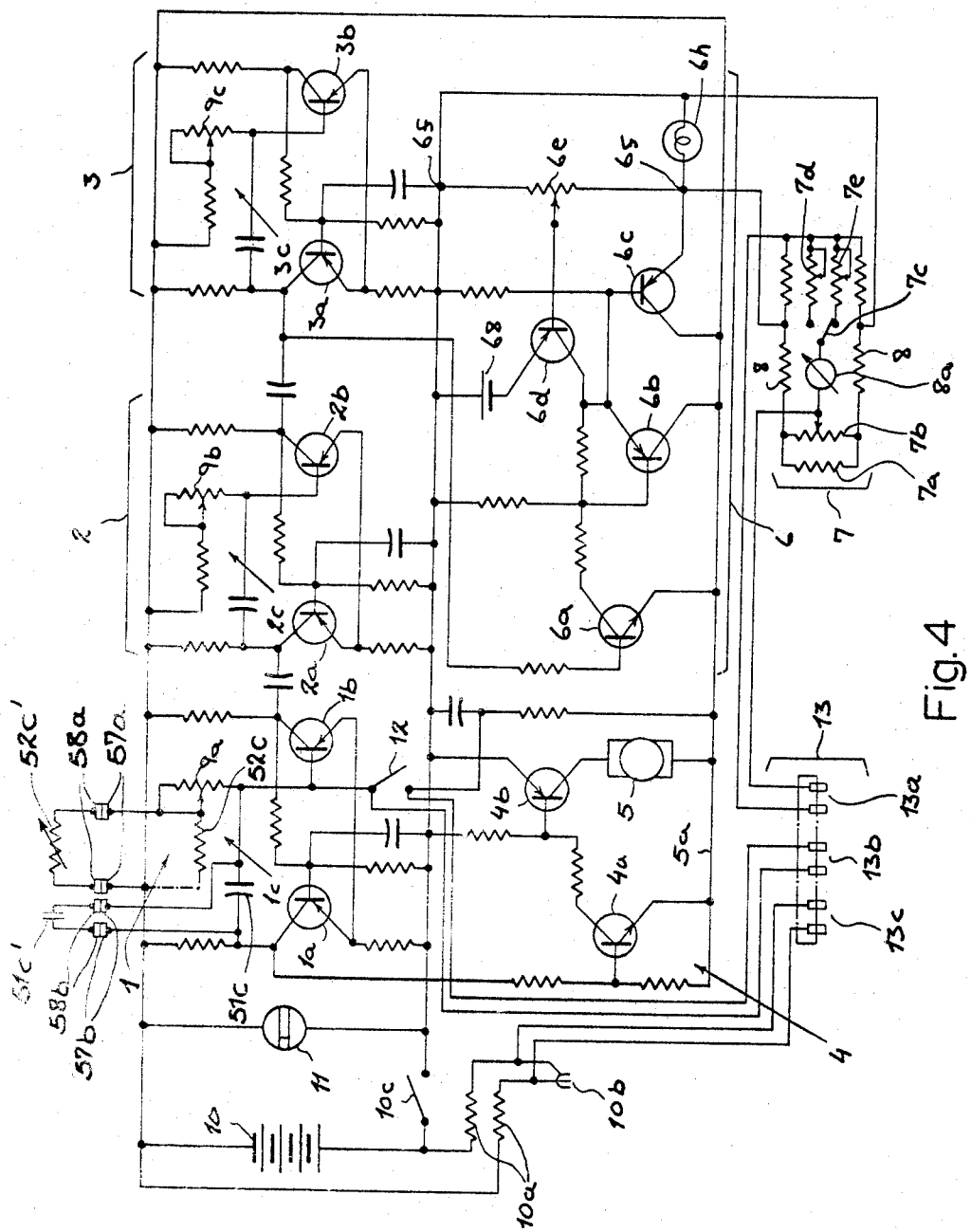
FIG. 4 is a circuit diagram of the circuit means for controlling the operation of a portable gas analyzer in accordance with this invention.

Referring first to FIGS. 1 and 4 of the drawing, in which I show a gas analyzer 100 of the type generally illustrated and described in my copending applications Ser. No. 521,104, and Ser. No. 521,395, filed Jan. 17, 1966, and Jan. 18, 1966, respectively, it will be seen that the analyzer comprises generally a battery 10 (which can be of the type illustrated and described in copending application Ser. No. 427,049 of Jan. 21, 1965) within a housing 101 provided with a measuring chamber 102 connected by duct means 103 with a sampling tube 104 as will be described in greater detail hereinafter. The duct means include a conduit 130 connecting a pump 131, whose motor is shown at 5, with the outlet via a further passage 132. The meter 8a of the measuring circuit represents the indicator means of the latter and can be a galvanometer connected in the diagonal of a resistance-sensitive means responsive to the concentration of a component of the gas mixture as described generally in my copending applications Ser. Nos. 416,655 and 440,223 of Dec. 7, 1964, and Mar. 16, 1965, respectively, now patents Nos. 3,266,293 and 3,343,402. A pushbutton 12 (FIGS. 1 and 4) is depressible to commence the measuring operation while a voltmeter 11 may be provided to show the state of charge of the battery, preferably in terms of measuring cycles remaining.

Within the measuring chamber 102, I provide resistance-responsive electrodes, here represented by the resistors 8 of a bridge 7, for measuring the conductance or resistance of a gas mixture induced into the measuring chamber 102 by the pump 131 when the latter is driven by the motor 5. The measuring chamber and pump arrangement can be any of those described in the aforementioned copending applications. The housing 101 of the apparatus is preferably provided with a plug 13 forming part of a plug-and-jack connection (see my copending application Ser. No. 521,104 filed Jan. 17, 1966).

The contacts 13a, 13b and 13c of this plug are adapted to be received within a jack (not shown) of a transmission net of a mine or other subterranean location at which the portable gas-analyzing device can be temporarily stationed as a fixed transmitter of the concentration of the gas to which the device is responsive.

The measuring network 7 comprises, in addition to the electrodes represented by resistors 8, a pair of resistors 7a, 7b, the latter of which is provided with a wiper and serves to calibrate the resistance bridge. A switch 7c in the indicator diagonal of the bridge then selectively connects the meter 8a in series with potentiometers 7d, 7e, adapted to be inserted in the bridge for matching it alternatively with the indicator at a remote monitoring station or the indicator within the housing of the portable gas analyzer as may be required.

The battery 10 is rechargeable through resistors 10a from the contact 13c of the plug-and-jack network; alternatively, recharging of the battery can be effected through a jack 10b on the housing of the analyzer when the instrument is used as a portable unit and is returned to the home station with the attendant.

To supervise the level of charge of the battery 10, I provide the aforementioned voltmeter 11 which, as previously indicated, is calibrated in terms of measuring cycles remaining and which is connected across the battery 10 when the main on/off switch 10c is closed. The indicating device 11 is illustrated in greater detail in my copending application Ser. No. 427,047 mentioned above.

Between the battery 10 and the voltage-stabilizing circuit 6 of the measuring network 7 I provide a three-stage timer circuit 1, 2, 3 which is described in greater detail hereinbelow. The voltage-stabilizing circuit 6 comprises the usual biasing resistors for a plurality of amplifier transistors 6a, 6b, 6c connected in tandem, as well as a control transistor 6d whose base is connected to a potentiometer 6e bridged across the output terminals 6f of the voltage-stabilizing network. Thus the potentiometer 6e serves as a voltage-sensitive divider which varies the conductivity of transformer 6d and thus the degree to which the transistors 6a, 6b, and 6c modify the voltage at these terminals to eliminate fluctuations in the usual manner. The voltage stabilizer 6 is generally similar to that described in the aforementioned earlier applications and is conventional, as has been noted, so that it need not be described in greater detail herein. A biasing battery 6g is provided for the voltage-sensing or control transistor 6d while a glow lamp 6h provides an indication of the "on" state of the measuring circuit.

The three-stage timing circuit 1, 2, 3 comprises three successively operable electronic monostable multivibrator switches in a chain, each of the multivibrator stages remaining in an "on" state after being triggered for a period determined by the time constant of a respective network; thereafter, each stage delivers a triggering pulse to the next stage to throw it into the "on" condition. Thus, each stage is turned on for a period of time determined by its respective R-C network and serves in turn to operate the next timing network, even after the original input signal is discontinued, for the preset time periods.

The first timer means, which is the subject of the present invention, includes a pair of transistors 1a and 1b together with the usual biasing resistors and an adjustable time-constant network 1c; the latter comprises a capacitive branch 51c and a further resistor 52c represented in dot-dash lines. As will be described in greater detail with reference to FIG. 1, this R-C network is provided with contacts 57a bridged across the symbolic resistor 52c for connecting into the R-C network any one of a number of resistors 52c' etc., which may be fixed or variable, via the contacts 58a of such resistors. The resistors 52c' etc. are each associated with a respective sampling tube and are adapted to compensate for changes in the length of the path between the mouth of this tube and the chamber 102 by increasing or otherwise varying the "on" time of network 1 accordingly. In this case, the resistive impedances 52c' are connected in series with the resistive branch of the time-constant network 1c. When it is desired to vary the time constant of this network via the capacitive branch, each sampling tube 104 etc. is provided with a respective capacitor 51c' whose contacts 58b engage the contacts 57b to connect the compensating capacitor in parallel with the capacitor 51c.

The timing network 1 energizes the pump motor 5 via an electronic switch 4 (FIG. 4) whose transistors 4a and 4b are again provided with the usual biasing resistors and function as ganged amplifiers. Thus the control signal from the collector of the transistor 1a is communicated to the base of transistor 4a to render the latter conductive and trigger the transistor 4b at the base of the latter. When the transistor 4b becomes conductive, it forms a path for electric current from the positive terminal of the battery 10 to the motor 5, the latter motor being returned to the negative terminal of the battery via a busbar 5a; closure of switch 12 activates the transistor 1b to commence a timing cycle and place the pump motor 5 in an "on" state for a period determined by the time constant of the R-C network 1c of the first timer stage 1. This interval of operation, which determines the quantity of ambient gas aspirated into the measuring chamber, is controlled by the total values of the resistive impedance of the resistance branch and the capacitive impedance of the capacitance branch as indicated earlier.

Upon the termination of this period, a control signal is delivered to the intermediate or "delay" timer stage 2 whose transistors 2a and 2b are provided with a time-constant network 2c designed to delay the "on" signal to the measuring circuit by a period of at least one second sufficient to permit the turbulence within the measuring chamber 5 to abate. After this delay, the timer stage 2 triggers the third stage 3 whose transistors 3a and 3b and R-C network 3c operate as previously described to energize the measuring circuit 7 via the voltage-regulating network 6. The measuring circuit 7 is thus also operated for an interval determined by its R-C circuit; each of the R-C networks has a respective variable resistance 9a, 9b, 9c in the resistive branch for fine adjustment of the time constant. The switch 12 is shunted by the contacts 13b which permit the measuring cycle to be initiated from a remote location.

Referring now in greater detail to the structure illustrated in FIG. 1, it will be seen that the apparatus is provided with a resistor 159a representing the fixed resistance of the resistive branch of the time-constant network 1c controlling the timer circuit of the motor 5. At the inlet opening 103' of the housing 101, the sampling tube 104 is mounted by means of a threaded portion 104a which is screwed into the female thread portion 103a at the end 103' of the duct means 103. The resistor 159a of the housing is connected via electrical conductors 155 and 156 to a pair of contacts 107 on the housing in the region of the intake opening 103. These contacts 107 are juxtaposed with a pair of countercontacts 108 mounted upon the suction tube 104 and are engageable therewith when this tube is affixed at the coupling means 103a, 104a to the housing. The tube 104 carries the compensating resistor 109 which represents the resistance 52c' described in connection with FIG. 4 and which is connected across the contacts 108. Upon mounting of the tube 104 upon the housing 101, the contacts 107 engage contacts 108 and thereby connect the resistors 109 and 159a in series so that these resistances together determine the ohmic value of the resistance branch of the time-constant network 1c and thus the duration of the operating interval of the motor 5. The ohmic value of the resistor 109 is, of course, calibrated in accordance with the volume of the tube 104 so that the motor 5 will operate just sufficiently to displace the additional volume represented by the tube 104 through the system. The contacts 107 and 108 are disposed, as can be seen in FIG. 1, beneath a cap 110 which has a resilient sleeve 111 adapted to seat against an annular inlet formation 112 of the housing 101 to hermetically seal the compartment surrounding the tube 104 and containing the contacts and resistor 109 from the ambient atmosphere.

Referring now to FIGS. 2 and 3, in which I show a telescopic arrangement of the sampling tube, it will be seen that the large-bore tube 114 and the small-bore tube 113 are telescopingly interfitted and composed of a synthetic resin and thus are electrically insulated. The tube 114 is provided at diametrically opposite locations along its inner wall with resistive strips 115 (e.g. by carbon deposition) which are engaged by respective contacts 117 carried by the inner tube 113 and are disposed within the annular clearance 116 formed by the tubes. While the strips 115 are shown to be disposed at diametrically opposite locations, it will be understood that it is possible to employ only a single resistive strip in which case a conductive strip would be located in the place of the other strip or a larger number of resistive strips my be provided and connected seriatim. The slide contacts 117 are interconnected via a wire 118 forming a conductive bridge or shunt between them while the strips 115 can be connected to respective contacts such as those shown at 108 or 58a. The use of a pair of such resistance strips permits the full length of the tube 114 to be exploited as the resistance element and effectively doubles the length of the resistor which could be used, thereby increasing the precision.

When a plurality of tubes are telescopingly interengaged, the resistive strips 115 may be connected with further contacts 117', as represented in dot-dash lines in FIG. 3, for engagement with the resistive strips 115' of an outer tube 114'. The strips 115' can then be connected at the base of the tube to the contacts 108'. Inasmuch as the tubes 114' and 114 are of successively smaller diameter, the specific resistivities of the resistive strips 115' and 115 are adjusted to be in proportion to the respective volumes so that the total compensating resistance contributed by the telescoping tube to the R-C network will always be in proportion to the volume of the extended arrangement regardless of whether one or the other of the tubes is extended to a greater or lesser extent. In order to prevent explosions, I provide on opposite sides of each of the contacts 117, 117' etc. respective pairs of seals 119a, 119b etc. which prevent the entry of gases into the compartment 116 from the ambient atmosphere or the duct 120 communicating with the chamber 102. Thus, any sparking which may develop upon an extension or contraction of the tube is confined and prevented from initiating an explosion. A key 121, 121' of each tube moves in a keyway of the next-lower tube to prevent angular disorientation of the telescoping assembly.

The invention described and illustrated is believed to admit of many modifications within the ability of persons skilled in the art, all such modifications being considered within the spirit and scope of my invention except as otherwise limited by the appended claims.

I claim:
1. In a gas-analyzing device having a housing, a gas-measuring chamber in said housing, pump means connected with said chamber for aspirating a flow of gas into the latter, measuring means in said housing for evaluating the composition of the gas aspirated into said chamber, and electric-timer means connected with said pump means for establishing an operating interval therefore, said electric-timer means having a time-constant network for controlling said interval, said housing having an inlet communicating with said chamber, the improvement which comprises:
   first electric contact means on said housing connected with said time-constant network;
   a sampling tube of variable length mountable on said housing in communication with said chamber through said inlet;
   electric impedance means on said tube variable in accordance with the length of the latter and connectable in circuit with said time-constant network for modifying said interval in accordance with the effective volume of said tube; and
   second contact means on said tube engageable with said first contact means upon the mounting of said tube on said housing and connected with said impedance means for placing said impedance means in circuit with said time-constant network.

2. The improvement defined in claim 1 wherein said time-constant network is a resistive-capacitive circuit including a resistor within said housing, said impedance means constituting a further resistance connectable in series with said resistor by said first and second contact means.

3. The improvement defined in claim 2 wherein said tube comprises at least two telescopingly interfitted tube parts and said resistance is a variable resistive means whose ohmic value is proportional to the degree of elongation of said tube.

4. The improvement defined in claim 3 wherein said tube parts include at least one inner part and at least one outer part receiving said inner part, said outer part having an inner surface formed with at least one longitudinally extending resistive strip forming said resistive means and said inner part being provided with a wiper engaging said strip.

5. The improvement defined in claim 4 wherein said outer part is formed with a pair of longitudinal resistive strips connectable at the base of said outer part with said second contact means, said inner part having a pair of electrically shunted wipers respectively engaging said strips, said parts being composed of synthetic resin.

6. The improvement defined in claim 5 wherein said strips of said outer part are connected with said second contact means via a further tube part surrounding said outer part and provided with a further pair of resistive strips electrically connected with the respective resistive strips of said outer part.

7. The improvement defined in claim 5, further comprising sealing means enclosing said wipers to prevent ignition of ambient gases by sparks generated upon sliding engagement of said wiper with said strips.

8. In a gas-analyzing device having a housing provided with an inlet, a gas-measuring chamber in said housing, duct means extending from said inlet to said chamber, pump means connected with said chamber for aspirating a flow of gas into the latter, measuring means in said housing for evaluating the composition of the gas aspirated into said chamber, and electric-timer means connected with said pump means for establishing an operating interval therefor, said electric-timer means having a time-constant network for controlling said interval, the improvement which comprises:
   first electric contact means on said housing connected with said time-constant network;
   a sampling tube mountable on said housing at said inlet, thereby changing the effective volume of said duct means from a relatively low value to a relatively high value;
   electric impedance means on said tube connectable in circuit with said time-constant network for modifying said interval in accordance with the change in effective volume from said relatively low volume to said relatively high volume; and
   second contact means on said tube engageable with said first contact means upon the mounting of said tube on said housing and connected with said impedance means for placing said impedance means in circuit with said time-constant network.

9. The improvement defined in claim 8 wherein said first contact means is disposed on said housing in the region of said inlet, further comprising mating connecting means on said tube and said housing for removably mounting said tube therein.

10. The improvement defined in claim 9, further comprising cap means forming a closed chamber around said tube for said first and second contact means and said impedance means.

11. The improvement defined in claim 8 wherein said time-constant network is a resistance-capacitance circuit having a capacitive branch, said impedance means being constituted as a condenser connected in parallel with said branch.

References Cited

UNITED STATES PATENTS

| | | | |
|---|---|---|---|
| 3,323,350 | 6/1967 | Roberts | 73—23 |
| 3,343,402 | 9/1967 | Hübner | 73—23 |

RICHARD C. QUEISSER, *Primary Examiner.*

C. I. McCLELLAND, *Assistant Examiner.*

U.S. Cl. X.R.

73—421.5